United States Patent [19]
> Runyan

[11] Patent Number: 4,574,342
[45] Date of Patent: Mar. 4, 1986

[54] RESONANCE DRIVER

[75] Inventor: Wesley G. Runyan, Cedar Rapids, Iowa

[73] Assignee: Rockwell International Corporation, El Segundo, Calif.

[21] Appl. No.: 523,999

[22] Filed: Aug. 17, 1983

[51] Int. Cl.$^4$ .......................................... H02M 7/515
[52] U.S. Cl. ...................................... 363/134; 363/97
[58] Field of Search ...................... 363/24, 25, 26, 55, 363/56, 95, 96, 97, 133, 134, 135

[56] References Cited

U.S. PATENT DOCUMENTS

| | | | |
|---|---|---|---|
| 3,938,023 | 2/1976 | Hutchinson | 363/25 |
| 4,058,758 | 11/1977 | Peterson | 363/25 |
| 4,196,469 | 4/1980 | Gurwicz | 363/97 |
| 4,225,913 | 9/1980 | Bray | 363/97 |
| 4,281,372 | 7/1981 | Kornrumpf | 363/20 |
| 4,370,701 | 1/1983 | Western | 363/49 |
| 4,415,960 | 11/1983 | Clark, Jr. | 363/56 |
| 4,453,207 | 6/1984 | Paul | 363/96 |

FOREIGN PATENT DOCUMENTS

| | | | |
|---|---|---|---|
| 2218643 | 10/1973 | Fed. Rep. of Germany | 363/95 |
| 56-88678 | 7/1981 | Japan | 363/133 |
| 888308 | 12/1981 | U.S.S.R. | 363/133 |

*Primary Examiner*—Peter S. Wong
*Assistant Examiner*—Judson H. Jones
*Attorney, Agent, or Firm*—George A. Montanye; H. Fredrick Hamann

[57] ABSTRACT

A power supply for a low-loss sinusoidal drive system is disclosed for powering thin-film electroluminescent displays (TFEL). A DC power source is coupled through a DC-to-AC inverter for driving an LC resonant tank circuit which is used to produce a sinusoidal supply voltage. A sinusoidal supply voltage is then coupled to produce a sinusoidal backplane driving voltage which, in cooperation with a logic circuit, controls the drive for selectively energizing segments of the TFEL display. The power supply is constructed to synchronize itself with the tank circuit in such a manner that sufficient power is added to make up for the tank losses and allow the tank to ring with a sustained constant voltage level. This produces an efficient sinusoidal power source which can accommodate varying loads and is operable at low voltage levels independent of output voltage requirements.

7 Claims, 12 Drawing Figures

FIG. 3a  $E_0$  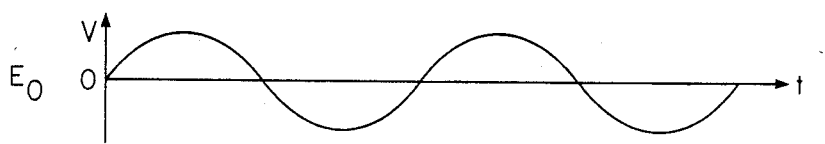
FIG. 3b  $I_T$  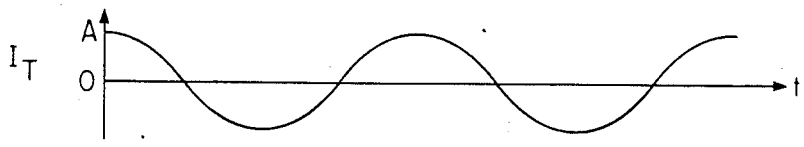
FIG. 3c  $E_1$  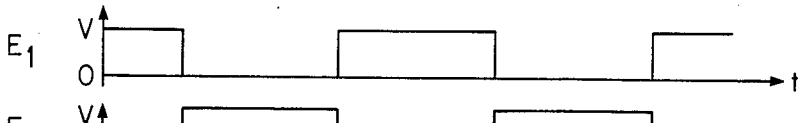
FIG. 3d  $E_2$  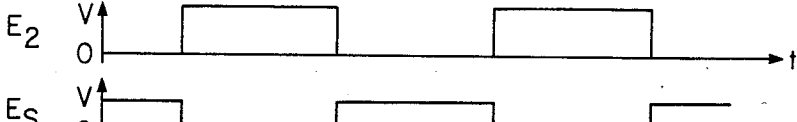
FIG. 3e  $E_S$  
FIG. 3f  $E_7$  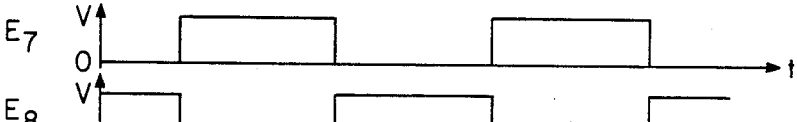
FIG. 3g  $E_8$  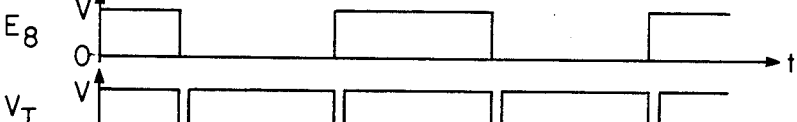
FIG. 3h  $V_T$  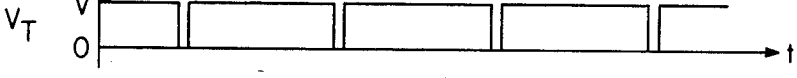
FIG. 3i  $V_C$  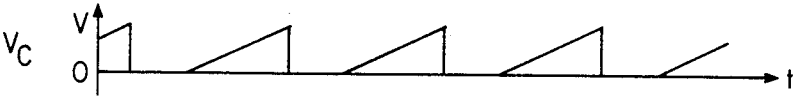
FIG. 3j  $V_X$  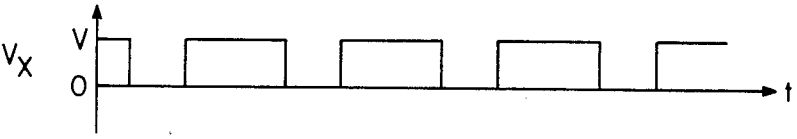

RESONANCE DRIVER

BACKGROUND OF THE INVENTION

The present invention relates to power supplies and drive circuits, and more particularly, to a power supply for providing sinusoidal drive for a thin-film electroluminescent display.

Recent developments in thin-film electroluminescent displays (TFEL) have made such devices attractive for use in a variety of display systems. Such devices are capable of providing excellent display clarity in adverse ambient light conditions and are capable of extended operation over wide temperature ranges. Such features are highly desirable in many avionics systems and particularly in military aircraft which must be capable of operating in severe environments. Use of these devices has been restricted, however, due to the complexity and the power inefficiency of the drive circuits needed to power the TFEL displays.

In conventional TFEL power supplies and drive systems, square waves have been extensively used. While this technique is successful in providing the requisite operation of the TFEL displays, the operation is achieved only with high power dissipation and therefore low system efficiency. This is caused by the highly capacitive electrical nature of the TFEL devices which results in large reactive currents when driven by the square wave thereby resulting in the noted power dissipation. As a result of this operation, even though the luminous efficiency of the TFEL devices is high, power losses produced by the power supply and circuit conductors render the system much less efficient and therefore impractical in many environments.

In other instances, attempts have been made to drive the TFEL devices and accompanying displays by use of a resonating technique. In such instances, an inductance is used to produce a resonant circuit (using the inherent TFEL capacitance) which requires less power for system drive and results in less power dissipation. Such attempts, however, require highly complex circuits with additional losses and have not resulted in TFEL power supply and drive systems with much practical application. As will be understood, the above described technique requires separate circuits for each TFEL element to take advantage of the inherent capacitive reactance to produce the resonant circuit. Naturally, in the environments in which their use is intended, simplicity, low cost, and highly reliable operation with little power dissipation is required.

In order to overcome the above deficiencies, it has been suggested that sinusoidal drives be used in lieu of the square wave drive. As would immediately be apparent, a straight application of a sinusoidal drive in place of the square wave drive would not produce much additional benefit if the sinusoidal waveform were to be produced merely by amplifying a low level sinusoid. This would be due to the additional power loss incurred in the linear amplification of the low level sine waveform needed to convert a sine wave to a level sufficient to drive the TFEL devices. Again, such a system would not be desirable where highly power efficient circuits are required to drive the TFEL displays.

Accordingly, there is still a need for the development of power supplies capable of providing sinusoidal drive of greater power efficiency which may be used in connection with the supply of sinusoidal waveforms to TFEL devices and similar equipment. The present invention has therefore been developed to overcome the shortcomings of the above known and similar techniques and to produce an improved and highly efficient TFEL power supply.

SUMMARY OF THE INVENTION

In accordance with the present invention, a power supply is constructed which is capable of producing a sinusoidal waveform. In the present instance, a DC-to-AC converter circuit is constructed to couple a DC power source to drive an LC tank circuit for producing a resonant sinusoidal output wave. A synchronizer circuit is coupled to sense the voltage level at the output of the LC tank circuit to produce a feedback loop which controls the components of the inverter to inject sufficient energy into the LC tank circuit to maintain an output voltage at a selected value. Transistor switches in the inverter are coupled to provide the alternating control necessary to inject the required energy into the tank circuit and maintain oscillation. Synchronizing control circuitry is coupled to sense the output of the LC tank circuit to control the output voltage level to accommodate instantaneous need and varying load levels.

It is therefore a feature of the invention to provide an improved power supply for TFEL displays.

It is a further feature of the invention to provide a power supply of reduced complexity for TFEL displays which render such systems more versatile for use in many environments.

Another further feature of the invention is to provide a TFEL power supply which produces a sinusoidal waveform by the use of an LC tank circuit.

Yet another feature of the invention is to provide a sinusoidal TFEL power supply by use of a resonant circuit driving a TFEL device.

Still another feature of the invention is to provide a TFEL power source which reduces power losses in operation and renders the system more efficient.

A still further feature of the invention is to provide a resonant driving circuit which synchronizes itself with an external tank circuit.

Yet another feature of the invention to provide a power supply which injects sufficient power into a tank circuit to allow a tank circuit to ring with a sustained constant voltage.

Still another feature of the invention is to provide a sinusoidal power supply using an LC tank circuit which adjusts its drive level in accordance with instantaneous need by use of feedback to accommodate sinusoidal currents and varying loads.

Still a further feature of the invention is to provide a sinusoidal power supply using an LC tank circuit which can be scaled to substantially any power level and tank voltage by use of an output transformer and feedback network in order to provide operation at low voltages substantially independent of output voltage requirements.

These and other advantages and novel features of the invention will become apparent from the following detailed description when considered with the accompanying drawings wherein:

BRIEF DESCRIPTION OF THE DRAWINGS

FIGS. 3a–3j are diagrams showing the waveforms produced at various points in the operation of the circuits shown in FIG. 2.

DETAILED DESCRIPTION OF A PREFERRED EMBODIMENT

Figure 1:
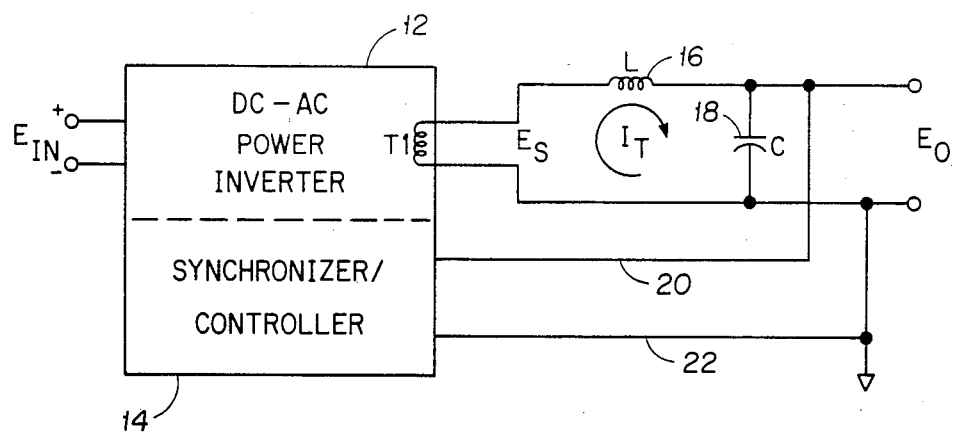
FIG. 1 is a schematic block diagram representing the sinusoidal power supply of the present invention.

Thin-film electroluminescent displays and the devices used to implement such displays are well known in the prior art. Recently, the technology has advanced rapidly and improvements in the devices have made them highly attractive for use in a variety of display systems including commercial and military avionics. Since such TFEL devices are generally well-known, they will not be described with great detail herein. Reference may be made to *The Proceedings of the Society for Information Display*, Volume 22, #1, 1981, pp. 47–62, for exemplary embodiments of conventional TFEL devices to which the present invention is applicable.

Generally, however, a TFEL display is formed from individual TFEL devices which include a plurality of segments that may be individually made visible in response to electrical and electronic control of the individual segments. Like other similar electronic devices, the particular energization of the segments allows a variety of alpha-numerics to be displayed and the configuration of the particular segments may also be used to form pictorial or graphic displays. The segments are energized by providing a backplane voltage (which is an alternating current type voltage) to the device or series of devices, and another (alternating current type) voltage to selected electrical connections coupled to the individual segments so that the differential voltage between the backplane and the segments will make them luminous. By selectively controlling the application of the AC voltage to the individual segments, the AC driving voltage needed to make the segments luminous will be selectively applied to those individual segments.

As has been noted previously, although the luminous efficiency of TFEL devices is fairly high (in the range of at least several lumens per watt), systems which have been used to produce actual displays have practical efficiencies which are much lower. The relative inefficiencies have been produced as a result of the highly capacitive electrical nature of the TFEL devices. This construction results in large reactive currents which cause any power supply drive circuit to dissipate energy much greater than the actual power required for the generation of light in the display itself.

By way of example, various prior art has attempted to drive the TFEL devices with square waves by switching voltage sources with alternating polarity. While this is the simplest TFEL drive technique that may be implemented with a variety of circuits, the circuit switch impedances prevent the formation of accurate square waves and more importantly dissipate large quantities of power in the process. This is more particularly described in the co-pending application entitled "A Low-Loss Sinusoidal Drive System" by Wesley G. Runyan, filed on even date herewith and assigned to the same assignee as the present invention, which is hereby incorporated herein in its entirety.

In accordance with the teachings of the above-referenced application, it has been found that the efficiency of a TFEL drive system may be improved by the use of a sinusoidal drive system coupled to provide a sinusoidal backplane voltage. The reasons for the improvement in efficiency when using a power supply which drives an LC tank circuit is clearly set forth in that co-pending application. In accordance with the present invention, a unique resonant power supply is described which produces the sinusoidal drive through the use of an LC tank circuit which allows highly efficient production of the sinusoidal waveform.

Referring now to FIG. 1, there is shown generally a resonance power supply in accordance with the present invention. The power supply generally comprises a current feedback power converter 12, a synchronizer/controller 14, and an LC tank circuit formed by inductor 16 and capacitor 18. A feedback signal derived over a line 20 is coupled to provide a feedback control for the synchronizer/controller 14 while line 22 forms the common ground for the controller 14 and DC-to-AC power inverter 12. The inverter output $E_S$ is coupled to provide the current $I_T$ to initiate oscillation in the LC tank circuit and to provide the injection of a voltage to make up for tank losses and sustain the oscillation in the tank circuit. The feedback from the tank circuit to the synchronizer/controller 14 allows the power inverter 12 to be controlled so that the output is precisely timed and controlled in amplitude to sustain undamped ringing of the LC tank circuit at an output voltage $E_O$ larger than that of the inverter.

Figure 2:
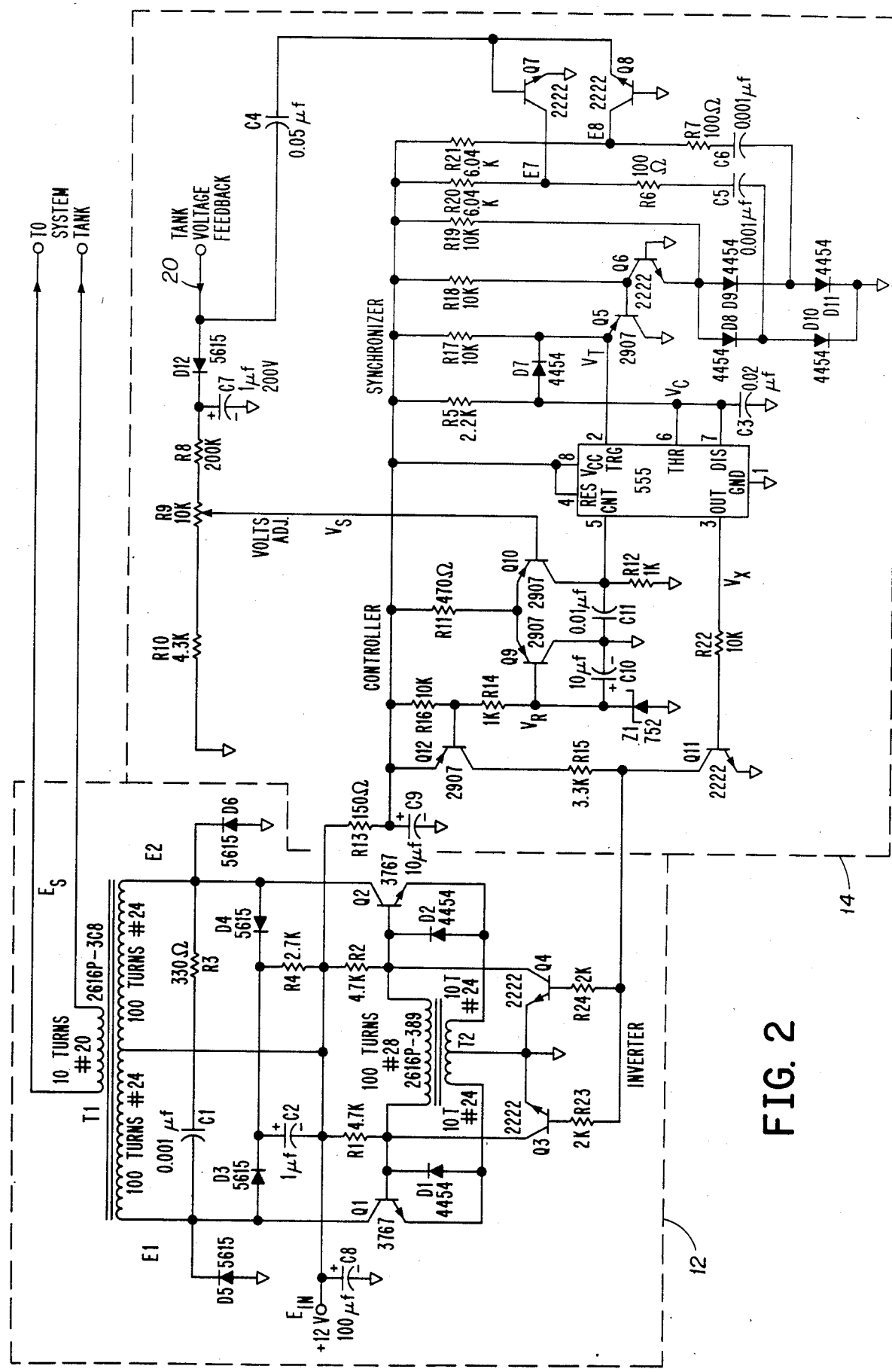
FIG. 2 is a detailed schematic diagram showing the components and interconnections of the elements forming the power supply of the present invention.

Turning now to FIG. 2, there is shown a detailed schematic diagram of the elements forming the circuit of FIG. 1. The components, their values and their interconnection are all as illustrated in the diagram and will only be described with reference to those primary components necessary to understand the invention and its operation. The primary components of the inverter include transistors Q1 and Q2, diodes D1 and D2, and transformers T1 and T2. The inverter interface with the synchronizer/controller 14 is via transistors Q3 and Q4, which provides the control from the feedback at the output of the LC tank circuit. For purposes of illustration, the inverter 12 will first be described with respect to its operation independent of the synchronizer/controller 14 which will thereafter be described for completion of the control arrangement.

In the circuit shown, a transformer T1 has a center tapped primary winding forming two primary portions coupled to a common secondary winding which provides the inverter output $E_S$. Each terminal end of the primary winding is coupled to the collector of a transistor Q1 or Q2, respectively, which in turn has its emitter coupled to one end of a center tapped primary winding of the transformer T2. The secondary winding of the transformer T2 has its ends connected to the base of transistors Q1 and Q2, respectively, as well as to the collectors of transistor Q3 and Q4. The emitters of transistors Q3 and Q4 are in turn coupled in common to the center tap of the primary of transformer T2. The bases of transistors Q3 and Q4 are coupled through resistors R23 and R24, respectively, to a common terminal which is in turn coupled to the collector of transistor Q11 of the synchronizer/controller 14 which will be later described. Diodes D1 and D2 have their anodes coupled to the emitter of transistors Q1 and Q2, respectively, while their cathodes are coupled to the respective bases of those same transistors Q1 and Q2. The other elements are coupled as shown and produce the functions described later herein.

The DC input to the inverter is provided as voltage $E_{IN}$ and is coupled to one terminal of resistors R1 and R2, respectively, having their second terminal coupled to opposite ends of the secondary winding of transformer T2. Resistors R1 and R2 are bias resistors and serve to place the transistors Q1 and Q2 in their active high gain regions so that oscillations can be initiated in the LC tank circuit. When the transformer T1 secondary is connected into the LC tank circuit, an input DC voltage $E_{IN}$ can be applied to the inverter input terminals. At this time, one of the transistors Q1 or Q2 conducts more heavily than the other, resulting in a net current applied to the opposing T1 primary windings. This net current is transformed into the T1 secondary winding where it produces the voltage $E_S$ and begins to drive the LC tank circuit. As the current builds up in the tank, current also builds up in the collector-to-emitter circuit of the more heavily conducting transistor Q1 or Q2, providing net excitation to the opposing primary windings of current transformer T2. The net excitation current is transformed into the secondary of T2 where it serves as a base drive for the conducting transistor and causes a turn-off voltage across D1 or D2 for the non-conducting transistor, respectively. This operation continues until one transistor Q1 or Q2 is fully on and the other is fully off, thereby applying the DC voltage $E_{IN}$ to one of the T1 primaries, while completely disconnecting the other primary.

Once this condition is reached, T1 is driven by the DC voltage source of magnitude $E_{IN}$ which is transformed to the T1 secondary where it causes the tank current to build up. The buildup of the tank current eventually diminishes as the tank capacitor voltage builds towards a peak. The tank current finally reverses its polarity as the capacitor voltage passes its peak. The current reversal in the T1 secondary is transferred into the T1 primary where it causes the role of transistors Q1 and Q2 to be reversed. The entire aforementioned described sequence is then repeated in the opposing polarity until, after a few cycles, a steady-state oscillating condition is reached, thereby producing the various waveforms of FIGS. 3a–3e, where $E_O$ is the output voltage from the tank circuit, $I_T$ is the tank current, $E_S$ is the secondary voltage of transformer T1, and $E_1$ and $E_2$ are the voltages of the primary windings of transformer T1.

In the construction and operation of the above inverter, spurious oscillations may be introduced due to leakage inductance and interwinding capacitance in the transformer T1. These are suppressed by a damper consisting of resistor R3 and capacitor C1 connected as shown. For the above reasons and for additional protection of the transistors Q1 and Q2 from excessive voltage spikes, a spike clipper is also constructed using the configurations of diodes D3 and D4, resistor R4 and capacitor C2 coupled as shown in FIG. 2. Diodes D5 and D6 are also coupled to provide particular current paths at various intervals during the oscillating sequence when control is imposed by the synchronizer/controller 14 as will be described below.

The synchronizer/controller 14 is constructed to allow the inverter to operate as described above when the transistors Q3 and Q4 are off. When transistors Q3 and Q4 are on, however, the controller 14 diverts inverter drive current from the bases of transistors Q1 and Q2. This diverting or shunting action of the drive current from the inverter 12 occurs during the latter portion of each oscillating cycle, with the time duration determined by the voltage feedback from the LC tank circuit. Accordingly, the inverter is controlled by pulse width modulation of its drive current as a function of the output voltage.

In order to accomplish the pulse width modulation, a 555 timer IC chip is used. In this construction, input DC voltage $E_{IN}$ is coupled through R13 to produce a voltage across capacitor C9. This voltage is coupled to an exponential charging circuit consisting of resistor R5 and capacitor C3 which provides a charging voltage $V_C$ (FIG. 3i) to the threshold and discharge terminals 6 and 7, respectively, of the 555 timer. Capacitor C3 is discharged through diode D7 (through the collector-emitter of Q5) at the beginning of each half-cycle of oscillation. The negative going pulses driving diode D7, at the emitter of transistor Q5, are also supplied to the trigger terminal 2 of the 555 timer to allow timing periods to begin.

In order for the synchronizer portion of the synchronizer/controller 14 to provide the control synchronization to the half-cycles of oscillation, feedback on line 20 is provided from the LC tank circuit. The synchronizer portion begins operation by sensing the rate of change of the tank voltage via the differentiating characteristics of the capacitor C4 which has one terminal coupled to receive the feedback voltage and the other coupled to the base and emitter, respectively, of transistors Q7 and Q8. The current through capacitor C4, which is proportional to the derivative of the tank voltage (e.g., $i = C dv/dt$) serves as a drive to transistor switches Q7 and Q8. Thus, Q7 is on when the tank voltage is increasing and Q8 is on when the voltage is decreasing. In operation, one or the other of the square waves shown in FIGS. 3f and 3g as voltages E7 and E8 is provided to the collectors Q7 and Q8, respectively, with each having a falling edge at the positive and negative crests of the tank voltage, respectively. The falling edges are detected by the network R6, R7, C5, C6, D8, D9, D10 and D11, which causes amplifier Q6 and emitter/follower Q5 to produce the synchronizing pulse train shown as $V_T$ in FIG. 3h.

The function of the controller portion of the synchronizer/controller 14 is to adjust the duration of the synchronized time periods such that the inverter maintains a constant tank voltage. This requires the tank voltage to be sensed, which is accomplished by feedback from line 20 to the resistor R9. The controller portion begins its operation by sampling the tank voltage by way of a peak detector comprised of a diode D12, capacitor C7 and voltage divider formed by resistors R8, R9, and R10. The voltage sample $V_S$ is compared with a reference voltage $V_R$ by a differential amplifier stage formed by transistors Q9, Q10 and resistors R11 and R12. The resulting error signal provided by the differential amplifier is applied to terminal 5 of the 555 timer control. This error signal controls the voltage to which the capacitor C3 must charge before the timing period is terminated. The 555 timer output $V_X$ at terminal 3 is high during the timing period and low thereafter as shown in FIG. 3j, thereby controlling the inverter drive shunting transistors Q3 and Q4 by way of an amplifying stage formed by transistors Q11 and resistor R15. This signal path also allows excess voltage to cause the inverter drive into transistors Q1 and Q2 to be shunted away during the greater portion of each half-cycle, thereby causing the tank voltage to be reduced.

As was previously noted, input to the inverter is coupled through voltage filters formed by capacitors C8, C9 and R13. Also, Zener diode Z1 and resistor R14 and capacitor C10 form a reference voltage source providing the reference voltage $V_R$. A start-up switch formed by transistor Q12 and resistor R16 disables the synchronizer/controller 14 output from the collector of transistor Q11 during start-up (i.e., when $E_{IN}$ is less than the reference voltage $V_R$) so that the inverter can begin oscillating without feedback control to enable reliable start-up. Pull-up resistors R17, R18, R19, R20 and R21, and drive-limiting resistors R22, R23 and R24, as well as noise filter capacitor C11 complete the circuit in performing those functions conventional in the art.

In accordance with the above, a resonator circuit is described which synchronizes itself with an external tank circuit formed by an LC section comprising an inductor and a capacitor which may be totally or paritally composed of a TFEL device. The circuit operates to add sufficient power to the tank system to make up for losses, thereby allowing the tank to ring with a sustained constant voltage level. The circuit is very power efficient in that the only dissipative components in the power inverter are those required for starting bias, spurious oscillation damping, and spike suppression. The circuit operates to adjust the power transistor drive level according to the instantaneous need by use of the current feedback transformer T2, thus accommodating sinusoidal currents and varying loads. The circuit can be scaled to almost any power level and tank voltage merely by design of the output transformer T1 and the feedback sampling network over line 20. The circuit may therefore be operated at low voltage independently of the output voltage requirements to produce an output tank voltage which is sinusoidal with a distortion level determined by the Q factor of the tank. All of these are advantages which are unrecognized by the prior art.

While particular circuits have been shown and described in the above-noted embodiment of the invention, it is apparent that other circuits could be used to produce similar results. Accordingly, it is apparent that other obvious variations and modifications of the present invention are possible in light of the above teachings. It is therefore to be understood that within the scope of the appended claims, the invention may be practiced otherwise than as specifically described.

What is claimed is:

1. A resonant power supply system comprising:
   means for providing a DC voltage;
   means for converting said DC voltage into an alternating current and providing an alternating current output;
   an inductance-capacitance tank circuit coupled to receive said alternating current output and produce a resonant sinusoidal voltage output across the capacitance of said tank circuit;
   means responsive to said resonant sinusoidal voltage output for controlling said means for converting to synchronize and control said alternating current to maintain a constant voltage, sinusoidal resonant output from said tank circuit; and
   a capacitive impedance coupled as an electric load in electrical parallel with capacitance of said tank circuit to receive said resonant sinusoidal voltage.

2. The system of claim 1 wherein said means for controlling includes means for shunting portions of said alternating current during a portion of each half-cycle to reduce the voltage of said resonant sinusoidal output.

3. The system of claim 2 further including means for disabling said means for shunting for a predetermined period of time.

4. The system of claim 1 wherein said means for controlling comprises means for detecting a signal proportional to said resonant sinusoidal voltage output, means for providing a reference voltage, means for comparing said detected signal with said reference voltage and providing a control output, means responsive to said resonant sinusoidal voltage output for providing a timing signal, means responsive to said control output and said timing signal for providing a half-cycle control signal, and means responsive to said half-cycle control signal for shunting a portion of said alternating current during each half-cycle to reduce the voltage of the resonant sinusoidal voltage output.

5. A sinusoidal resonant drive system comprising:
   a first transformer having a primary winding with first and second end terminals and a center tap terminal, and a secondary winding with first and second end terminals;
   a tank circuit having an inductor and capacitor coupled such that one terminal of said inductor is coupled to the first end terminal of said first transformer secondary winding and another terminal of said inductor is coupled to one terminal of said capacitor to form a resonant sinusoidal voltage output terminal, and said capacitor has another terminal coupled to the second end terminal of said first transformer secondary winding;
   a second transformer including a primary winding having first and second end terminals and a center tap terminal and a secondary winding having first and second end terminals;
   a first transistor having a base, collector and emitter with the collector coupled to the first end terminal of said first transformer primary winding, the emitter coupled to the first end terminal of said second transformer primary winding and thes base coupled to the first end terminal of said second transformer secondary winding;
   a second transistor having a base collector and emitter with the collector coupled to the second end terminal of said first transformer primary winding, the emitter coupled to the second end terminal of said second transformer primary winding, and the base coupled to the second end terminal of said second transformer secondary winding;
   a first diode having its anode coupled to the emitter of said first transistor, and its cathode coupled to the base of said first transistor;
   a second diode having its anode coupled to the emitter of said second transistor, and its cathode coupled to the base of said second transistor;
   a source of DC voltage;
   means for coupling said source of DC voltage to the first and second end terminals of said second transformer secondary winding and to the center tap terminal of said first transformer primary; and
   means coupled between the base of each of said first and second transistors and the center tap of said second transformer primary winding and responsive to said resonant sinusoidal voltage output for shunting current during each half-cycle of said resonant sinusoidal voltage output for maintaining a constant resonant sinusoidal voltage output.

6. The system of claim 5 wherein said means for shunting comprises a third transistor having a collector coupled to the first end terminal of said second transformer secondary winding, an emitter coupled to the center tap of said second transformer primary, and a base, and a fourth transistor having a collector coupled to the second end terminal of said second transformer secondary winding, an emitter coupled to the center tap of said second transformer primary winding, and a base, and means coupled to the base of each of said third and fourth transistors for alternately controlling the transistors in response to said resonant sinusoidal voltage output to produce current shunting during each half-cycle of said resonant sinusoidal voltage to maintain said resonant sinusoidal voltage output constant.

7. A resonant power supply system comprising:
means for providing a dc voltage;
means for converting said dc voltage into an alternating current of a given frequency and providing said alternating current as an output;
an inductance-capacitance tank circuit coupled to receive said alternating current output and produce a resonant sinusoidal voltage output across the capacitance of said tank circuit at a frequency equal to said given frequency;
means responsive to said resonant sinusoidal voltage output for controlling said means for converting to synchronize and control said alternating current to maintain a constant voltage, sinusoidal resonant output from said tank circuit at said given frequency; and
a capacitive impedance coupled as an electric load in electrical parallel with capacitance of said tank circuit to receive said resonant sinusoidal voltage.

* * * * *